(12) United States Patent
Yoshida

(10) Patent No.: US 10,081,408 B2
(45) Date of Patent: Sep. 25, 2018

(54) AIR SPRING STRUCTURE

(71) Applicant: Showa Corporation, Gyoda-shi (JP)

(72) Inventor: Kojiro Yoshida, Fukuroi (JP)

(73) Assignee: SHOW A CORPORATION, Gyoda-Shi (JP)

( * ) Notice: Subject to any disclaimer, the term of this patent is extended or adjusted under 35 U.S.C. 154(b) by 0 days.

(21) Appl. No.: 15/411,222

(22) Filed: Jan. 20, 2017

(65) Prior Publication Data
US 2017/0274959 A1 Sep. 28, 2017

(30) Foreign Application Priority Data
Mar. 25, 2016 (JP) ................................. 2016-062592

(51) Int. Cl.
| | |
|---|---|
| *F16F 9/48* | (2006.01) |
| *B62K 25/08* | (2006.01) |
| *F16F 9/02* | (2006.01) |
| *F16F 9/346* | (2006.01) |
| *B62K 25/04* | (2006.01) |

(52) U.S. Cl.
CPC ............ *B62K 25/08* (2013.01); *F16F 9/0209* (2013.01); *F16F 9/0218* (2013.01); *F16F 9/346* (2013.01); *B62K 2025/044* (2013.01); *B62K 2201/08* (2013.01)

(58) Field of Classification Search
CPC B62K 25/08; B62K 2025/044; B62K 65/128; B62K 2201/08; F16F 9/0209; F16F 9/0218; F16F 9/346
USPC ....................... 188/286, 287, 314, 315, 322.2
See application file for complete search history.

(56) References Cited

U.S. PATENT DOCUMENTS

| | | | | |
|---|---|---|---|---|
| 6,443,271 | B2 * | 9/2002 | Schmidt ................ | F16F 9/3242 |
| | | | | 188/284 |
| 9,133,902 | B2 * | 9/2015 | Spyche, Jr. ............. | F16F 9/346 |
| 9,551,395 | B2 * | 1/2017 | Fujihara | |
| 2003/0047397 | A1* | 3/2003 | Farr ........................ | F16F 9/062 |
| | | | | 188/282.8 |

(Continued)

FOREIGN PATENT DOCUMENTS

| | | |
|---|---|---|
| EP | 2607116 A | 6/2013 |
| JP | 4557531 B | 10/2010 |

(Continued)

OTHER PUBLICATIONS

Extended European Search Report dated Sep. 12, 2017 for the corresponding European Patent Application No. 17152956.3.

*Primary Examiner* — Pamela Rodriguez
(74) *Attorney, Agent, or Firm* — Leason Ellis LLP

(57) ABSTRACT

An air spring structure has a first communication hole formed in a peripheral surface of a cylinder and a second communication hole formed in the peripheral surface at a position closer to an axle than the first communication hole. A piston has a sliding portion that comes into contact with an inner peripheral surface of the cylinder and partitions the cylinder into an inner chamber and a balance chamber. The sliding portion has an axial length shorter than an axial length between the first communication hole and the second communication hole. A communication member has a communication path formed so as to pass through the first communication hole and the second communication hole to allow the inner chamber and the balance chamber to communicate with each other.

13 Claims, 9 Drawing Sheets

(56) References Cited

U.S. PATENT DOCUMENTS

| | | | |
|---|---|---|---|
| 2004/0020729 A1* | 2/2004 | Bertrand | F16F 9/44 188/285 |
| 2004/0094376 A1 | 5/2004 | Van Wonderen et al. | |
| 2004/0163905 A1* | 8/2004 | Braswell | F16F 9/48 188/286 |
| 2004/0182662 A1* | 9/2004 | Heideman | F16F 9/346 188/285 |
| 2006/0096816 A1 | 5/2006 | Norgaard et al. | |

FOREIGN PATENT DOCUMENTS

| | | |
|---|---|---|
| JP | 5180153 B | 4/2013 |
| JP | 2015-169322 A | 9/2015 |

* cited by examiner

AIR SPRING STRUCTURE

CROSS-REFERENCE TO RELATED APPLICATIONS

The present application claims priority under 35 U.S.C. § 119 to Japanese Patent Application No. 2016-062592, filed Mar. 25, 2016. The contents of this application are incorporated herein by reference in their entirety.

BACKGROUND

Field

The present disclosure relates to an air spring structure, and in particular, to an air spring structure provided in a front fork installed on a front wheel side of a two-wheeled vehicle to absorb vibration from road surfaces that is input to a front wheel.

Related Art

As a related art, an air spring is known which has a cylinder with a first end that is a closed end, a rod with a leading end thereof inserted through the cylinder via a second end thereof so as to move in and out of the cylinder, a piston that is housed in the cylinder so as to be able to slide and that is held at the leading end of the rod, and a first end chamber and a second end chamber defined by the piston in the cylinder and each having an air spring (Japanese Patent No. 4557531 and Japanese Patent No. 5180153).

In the above-mentioned air spring structure, a passage or an annular groove is formed in a sliding area for the piston in an inner peripheral surface of the cylinder as resetting means for resetting an internal pressure of the cylinder.

When the piston is at the passage or the annular groove, the first end chamber and the second end chamber are permitted to communicate with each other to make internal pressures of the first end chamber and the second end chamber equal.

SUMMARY

However, in the related art as described above, to make the internal pressures of the first end chamber and the second end chamber equal, the passage or the groove needs to be formed in the inner peripheral surface of the elongate cylinder on an inner side thereof with respect to an opening end thereof. This disadvantageously makes manufacture and configuration of the cylinder complicated.

The present disclosure has been developed in view of the above-described problem. An object of the present disclosure is to provide an air spring structure that allows the internal pressures of the first end chamber and the second end chamber defined in the cylinder to be made equal using a simple configuration.

To accomplish this object, air spring structure according to an aspect of the present disclosure includes a cylinder with a first end that is a closed end, a rod inserted into the cylinder in an axial direction from a second end of the cylinder, a piston held by the rod so as to slide on an inner peripheral surface of the cylinder, and a communication member provided on an outer peripheral surface of the cylinder. The cylinder has a first end chamber formed as an air spring at a first end side of the piston, at least a part of a second end chamber formed as an air spring at a second end side of the piston, a first communication hole formed in a peripheral surface of the cylinder, and a second communication hole formed in the peripheral surface at a position closer to the second end than the first communication hole.

The piston has a sliding portion that comes into contact with the inner peripheral surface of the cylinder and partitions the cylinder into the first end chamber and the second end chamber. The sliding portion has an axial length shorter than an axial length between the first communication hole and the second communication hole. The communication member has a communication path formed so as to pass through the first communication hole and the second communication hole to allow the first end chamber and the second end chamber to communicate with each other.

The aspect of the present disclosure is effective for allowing the internal pressures of the first end chamber and the second end chamber defined in the cylinder to be made equal using a simple configuration.

BRIEF DESCRIPTION OF THE DRAWINGS

FIG. 2A is a sectional view illustrating a compressed state, and FIG. 2B is a sectional view illustrating an extended state;

DETAILED DESCRIPTION (Embodiment 1)

(1-1. General Configuration of the Front Fork 4)

Figure 1B:
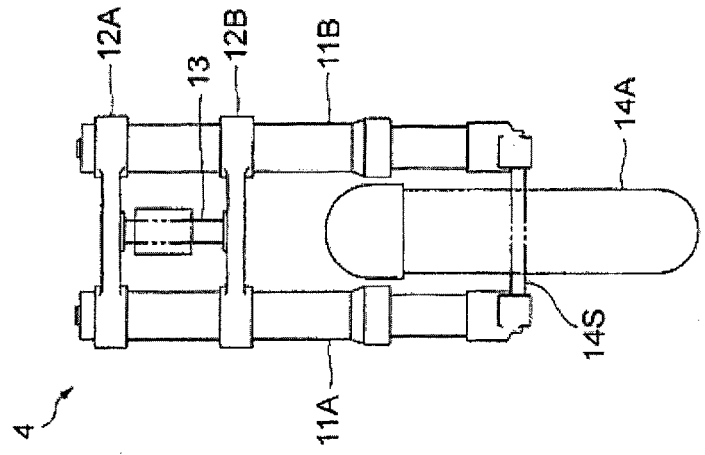
FIG. 1B is a drawing depicting a configuration of the front fork.
Figure 1A:
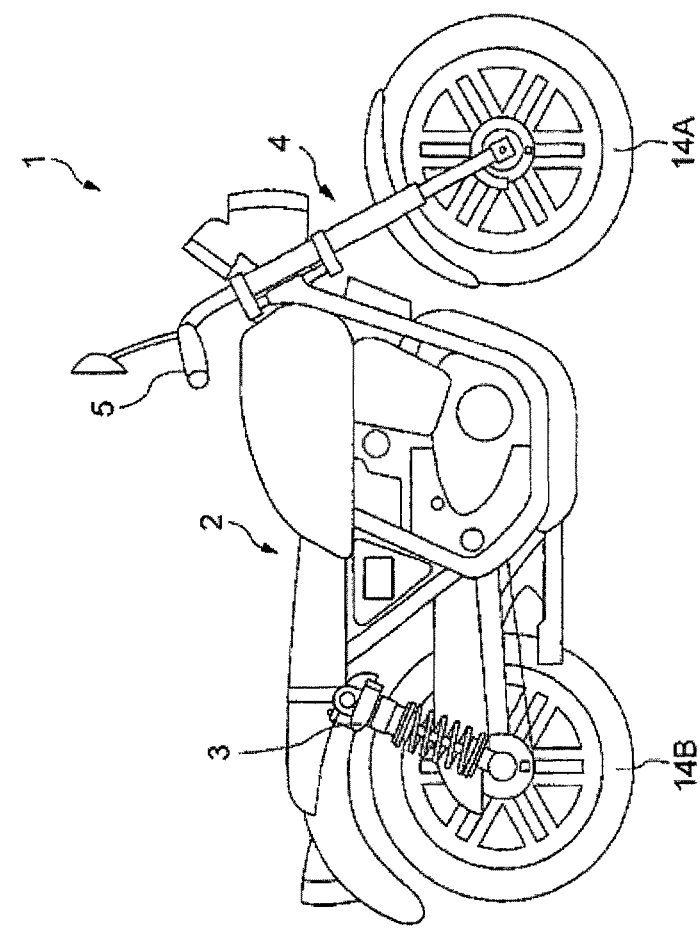
FIG. 1A is a drawing depicting a configuration of a motorcycle in which a front fork according to Embodiment 1 is mounted.

FIG. 1A is a drawing depicting a configuration of a motorcycle 1 in which a front fork 4 according to Embodiment 1 is mounted. FIG. 1B is a drawing depicting a configuration of the front fork 4.

The motorcycle 1 depicted in FIG. 1A includes a vehicle body 2, a front wheel 14A attached to an axle arranged in the front of the vehicle body 2, a rear wheel 14B attached to an axle arranged in the rear of the vehicle body 2, a rear suspension 3 that connects the vehicle body 2 and the rear wheel 14B together, the front fork 4 that connects the vehicle body 2 and the front wheel 14A together, and a handlebar 5 that allows the motorcycle 1 to be steered.

The front fork 4 couples the front wheel 14A to the vehicle body 2 of, for example, a two-wheeled vehicle or a tricycle to cushion impact and to transmit steering of the handlebar 5 to the front wheel 14A. In the present embodiment, as depicted in FIG. 1B, the front fork 4 includes a first fork leg 11A, a second fork leg 11B, a first bracket 12A, a second bracket 12B, and a steering shaft 13.

The first fork leg 11A and the second fork leg 11B are arranged on the right and left, respectively, of the front wheel 14A so as to sandwich the front wheel 14A between the first fork leg 11A and the second fork leg 11B. The first fork leg 11A and the second fork leg 11B supports the front wheel 14A via an axle 14S so as to make the front wheel 14A rotatable. The first fork leg 11A and the second fork leg 11B are configured to be compressible and extendable in an axial direction. In the present embodiment, a longitudinal direction of the first fork leg 11A is hereinafter referred to as the "axial direction".

The first fork leg 11A incorporates an air spring. In the present embodiment, the first fork leg 11A includes no damping mechanism. The first fork leg 11A will be described below in detail.

The second fork leg 11B includes a damping mechanism such as an oil damper. However, a configuration of the second fork leg 11B is not limited to this. For example, the second fork leg 11B may have a configuration similar to that of the first fork leg 11A.

The first bracket 12A and the second bracket 12B connect the first fork leg 11A and the second fork leg 11B together. The steering shaft 13 is connected to the first bracket 12A and the second bracket 12B at the respective opposite ends of the steering shaft 13. The steering shaft 13 is coupled to the vehicle body 2 to connect the front fork 4 to the vehicle body 2 so as to enable the front fork 4 to be steered (rotated).

(1-2. Configuration of the First Fork Leg 11A)
(1-2-1. Basic Configuration)

Figures 2A, 2B:
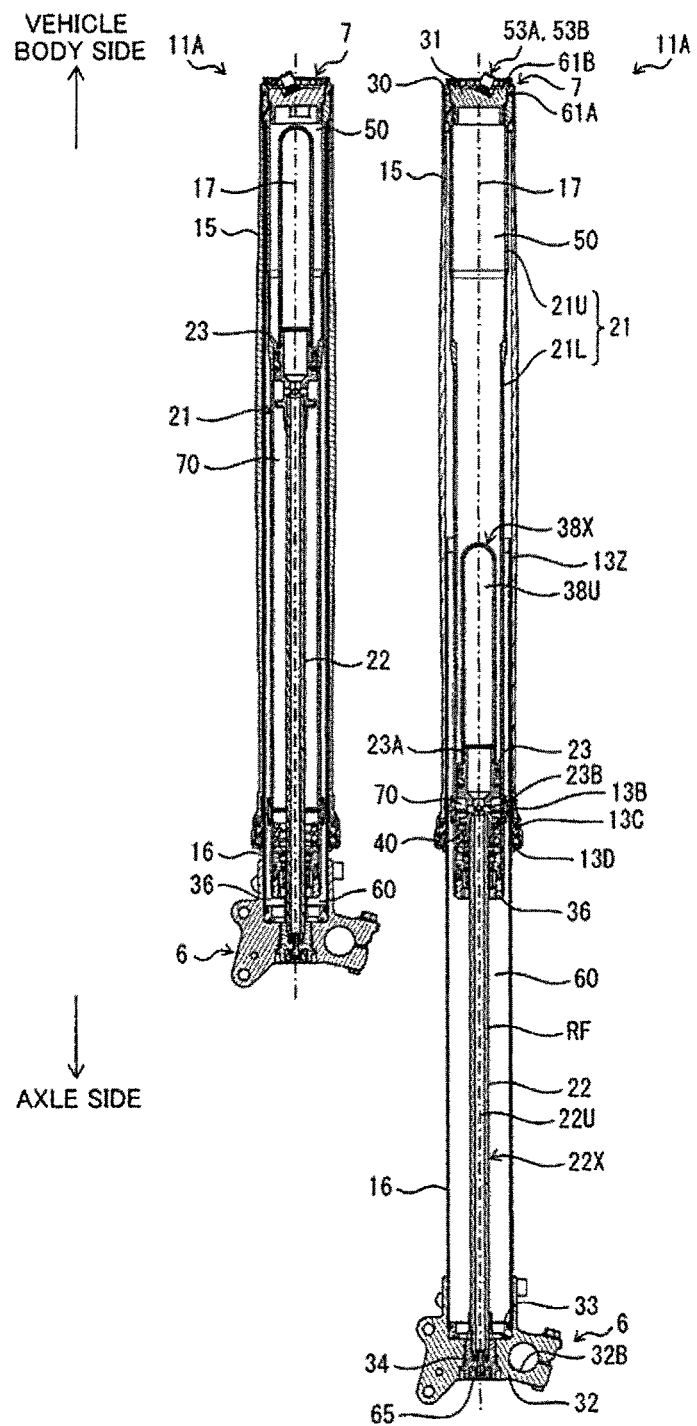
FIGS. 2A and 2B are sectional views of a first fork leg provided in the front fork.

FIGS. 2A and 2B are sectional views of the first fork leg 11A provided in the front fork 4. FIG. 2A is a sectional view of a compressed state, and FIG. 2B is a sectional view of an extended state.

As depicted in FIGS. 2A and 2B, the first fork leg 11A includes an axle side fixing portion 6, a vehicle body side closing member 7, an outer tube 15, an inner tube 16, a cylinder 21, a rod 22, a piston 23, a rod guide 36, and a plurality of air spring chambers (an inner chamber 50 (first end chamber), an outer chamber 60, a balance chamber 70 (second end chamber)).

For example, the first fork leg 11A forms a part of the front fork 4, in which the rod 22 is positioned below the cylinder 21, with the axle side fixing portion 6 being coupled to the axle of the motorcycle 1, a vehicle body side of the first fork leg 11A being coupled to a frame or the like of the motorcycle 1, the rod 22 being fixed to the axle side fixing portion 6, and the cylinder 21 being fixed to the vehicle body side closing member 7.

The axle side fixing portion 6 includes a bracket 32, a bottom piece 33, and a bottom bolt 34. The bottom piece 33 is fitted in an axle side opening of the inner tube 16 so as to seal the opening. The bracket 32 includes a connecting hole 32B for connecting the axle.

The bottom bolt 34 is provided with a pressure adjusting portion 65 that communicates with an internal space in the rod 22. The pressure adjusting portion 65 allows gas to be prevented from flowing to the outside through the internal space in the rod 22, while allowing a compression ratio of the gas in the balance chamber 70 to be adjusted via a gas chamber 22U (second end chamber) inside the rod 22.

The vehicle body side closing member 7 includes a cap 30 and a bolt portion 31 both closing openings of the outer tube 15 and the cylinder 21 that face the vehicle body 2. The vehicle body side of the first fork leg 11A is coupled to the vehicle body of the motorcycle 1, for example, via the first bracket 12A, the second bracket 12B, and the steering shaft 13. In the vehicle body side closing member 7, for example, seal members 61A and 61B such as O rings keep an airtight condition between the inside of the outer tube 15 and the cylinder 21 and the outside.

The bolt portion 31 is provided with an inner-chamber pressure adjusting portion 53A that allows adjustment of a charged pressure in the inner chamber 50 and an outer-chamber pressure adjusting portion 53B that allows adjustment of a charged pressure in the outer chamber 60.

The inner tube 16 is a cylindrical member and is fixed to the axle side fixing portion 6 at the axle side of the inner tube 16 so as to seal the axle side opening of the inner tube 16. The outer tube 15 is a cylindrical member, and the vehicle body side closing member 7 is fixed to the outer tube 15 at a vehicle body side thereof so as to seal the vehicle body side opening of the outer tube 15. A vehicle body side end of the inner tube 16 is inserted into the outer tube 15 via the axle side opening of the outer tube 15.

A seal member 13C, a dust seal 13D, and a bush 13B are provided on an inner peripheral surface of the outer tube 15 that is closer to the axle side opening thereof. A bush 13Z is provided on an outer peripheral surface of the inner tube 16 that is closer to the vehicle body side opening thereof. The outer peripheral surface of the inner tube 16 and the inner peripheral surface of the outer tube 15 are configured to freely slide via the bushes 13Z and 13B, the seal member 13C, and the dust seal 13D while maintaining air-tightness.

The inner tube 16 and the outer tube 15 are configured to be movable relative to each other along a central axis 17 of the inner tube 16 and the outer tube 15. The axle side fixing portion 6 and the vehicle body side closing member 7 move closer to each other during a compression stroke and away from each other during an extension stroke.

The first fork leg 11A further includes a cylindrically formed cylinder 21 located on an inner side of the outer tube 15 and the inner tube 16 and having a smaller diameter than an inner diameter of the inner tube 16 and a cylindrically formed rod 22 located on the inner side of the outer tube 15 and the inner tube 16 and having a smaller diameter than an inner diameter of the cylinder 21.

An axle side of the rod 22 is fixed to the axle side fixing portion 6 so as to seal an axle side opening of the rod 22. A vehicle body side of the cylinder 21 is fixed to the vehicle body side closing member 7 so as to seal a vehicle body side opening of the cylinder 21.

The cylinder 21 is formed by coupling an axle side cylinder 21L and a vehicle body side cylinder 21U together. A rod guide 36 having a rod through-hole 36h is provided in the axle side opening of the axle side cylinder 21L. A bush 37 is provided on an inner peripheral surface of the rod through-hole 36h, and an outer peripheral surface RF of the rod 22 and an inner peripheral surface of the bush 37 are configured to be slidable with respect to each other. A vehicle body side of the rod 22 is inserted into the cylinder 21 via the rod through-hole 36h.

Figure 3:
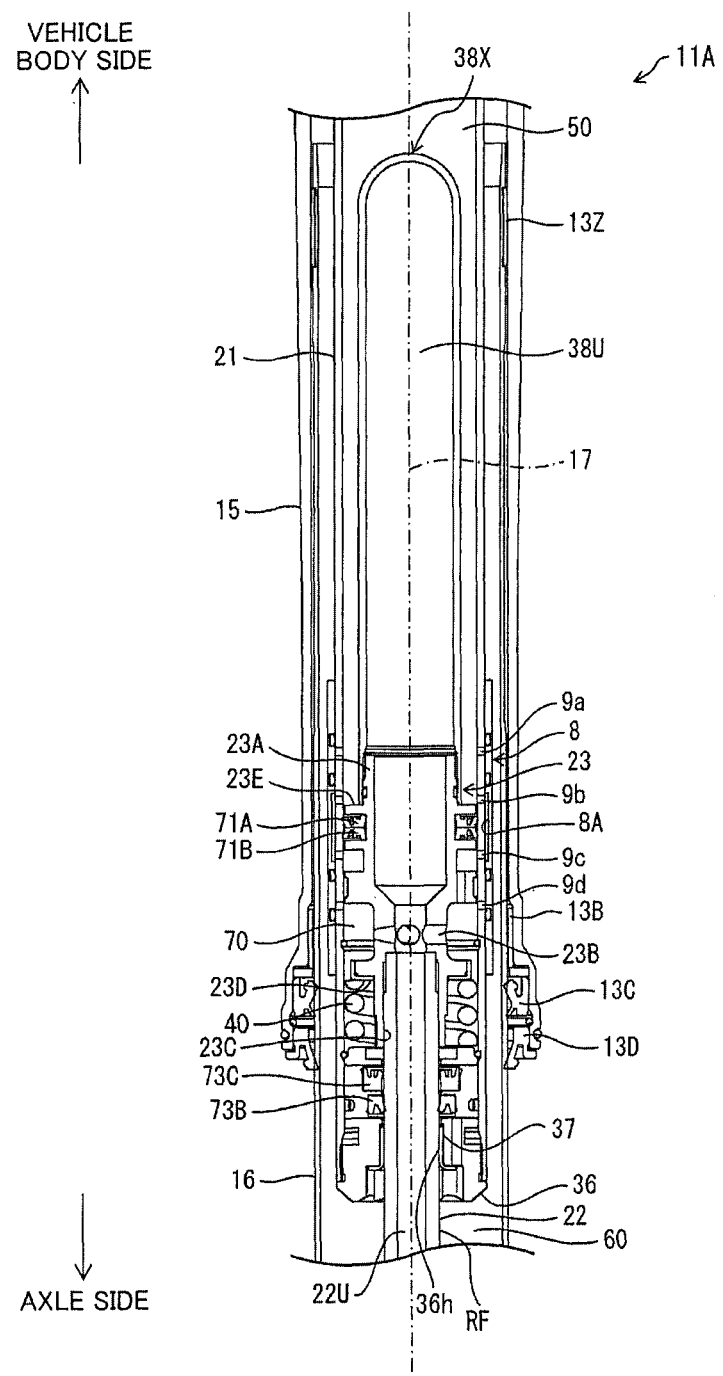
FIG. 3 is an enlarged sectional view of a piston and its surroundings provided in the first fork leg depicted in FIG. 2B.
Figure 4:
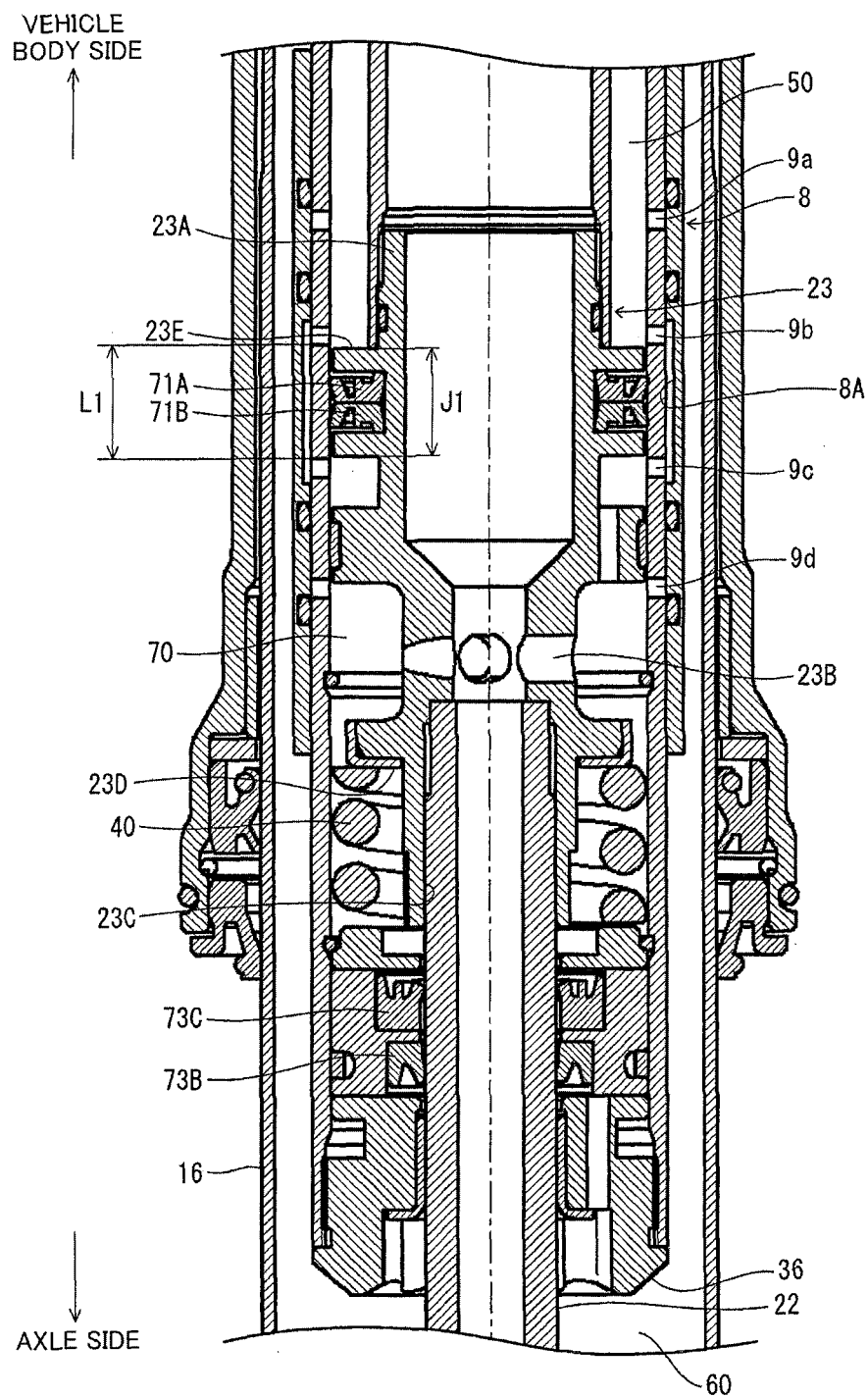
FIG. 4 is an enlarged sectional view of a main part of the piston and its surroundings depicted in FIG. 3.

FIG. 3 is an enlarged sectional view of a piston 23 and its surroundings provided in the first fork leg 11A depicted in FIG. 2B. FIG. 4 is an enlarged sectional view of a main part of the periphery of the piston 23 and its surroundings depicted in FIG. 3.

The piston 23 is provided at a vehicle body side end of the rod 22 inserted into the cylinder 21. A rebound spring 40 is provided between an axle side of the piston 23 and a vehicle body side of the rod guide 36. The rebound spring 40 extends spirally along the central axis 17 outside the outer peripheral surface RF of the rod 22.

An insertion hole 23C is formed on the axle side of the piston 23 such that a first end of the rod 22 is inserted into the insertion hole 23C. An outer peripheral surface of a portion of the piston 23 that defines the insertion hole 23C protrudes into a spiral center hole of the rebound spring 40 through an opening of the spiral central hole. A spring collision surface 23D is formed on a vehicle body side of the outer peripheral surface of the portion of the piston 23 that defines the insertion hole 23C. A first end of the rebound spring 40 collides against the spring collision surface 23D to prevent the piston 23 from extending longer than a given distance.

The outer tube 15, the inner tube 16, the cylinder 21, the rod 22, and the piston 23 are provided coaxially with the central axis 17.

A subtank coupling portion 23A is formed on a vehicle body side of the piston 23. The subtank coupling portion 23A is formed as a tubular portion having a smaller diameter than a diameter of the outer peripheral surface of the piston 23. A subtank 38X is defined by a hollow rod-like container that is open at a first end thereof and that is closed at a second end thereof.

Inside the piston 23, a communication path 23B is formed through which a gas chamber 38U in the subtank 38X and a gas chamber 22U inside the rod 22 communicate with the balance chamber 70. The subtank 38X is thus provided, which communicates with the balance chamber 70, enabling an increase in a volume of the balance chamber 70 to allow the compression ratio to be decreased even in a high-pressure situation. This stabilizes reaction force characteristics exhibited when the first fork leg 11A is maximally extended, improving steering stability.

(1-2-2. Configuration of the Gas Chamber)

As depicted in FIGS. 2A and 2B, an inside of the first fork leg 11A is defined into the inner chamber 50 serving as a first air spring chamber, the outer chamber 60 serving as a second air spring chamber, and the balance chamber 70 serving as a third air spring chamber. As depicted in FIGS. 3 and 4, lip packings 71A and 71B are provided which keep airtight the balance chamber 70 and the inner chamber 50, which are adjacent to each other. Lip packings 73B and 73C are also provided which keep airtight the balance chamber 70 and the outer chamber 60, which are adjacent to each other.

The inner chamber 50 is defined by a sealed space enclosed by the vehicle body side closing member 7, the piston 23, an inner peripheral surface of the cylinder 21 between the vehicle body side closing member 7 and the piston 23, and an outer peripheral surface of the subtank 38X.

The outer chamber 60 is defined by a sealed space enclosed by the outer peripheral surface RF of the rod 22, the axle side fixing portion 6, inner peripheral surfaces of the inner tube 16 and the outer tube 15, the vehicle body side closing member 7, an outer peripheral surface of the cylinder 21, and an axle side end of the rod guide 36.

The balance chamber 70 is defined by a space enclosed by the piston 23, the rod guide 36, and the inner peripheral surface of the cylinder 21 between the piston 23 and the rod guide 36.

The gas chamber 22U inside the rod 22 communicates with the balance chamber 70 via the communication path 23B formed in the piston 23. The rod 22 functions as a subtank 22X defining the gas chamber 22U for adjustment of the compression ratio of the balance chamber 70.

The subtank 38X communicates with the balance chamber 70 via the communication path 23B formed in the piston 23, and also communicates with the gas chamber 22U in the rod 22. The subtank 38X forms the gas chamber 38U for adjustment of the compression ratio of the balance chamber 70.

(1-2-3. Configuration of the Cylinder 21 and the Communication Member 8)

Figure 5:
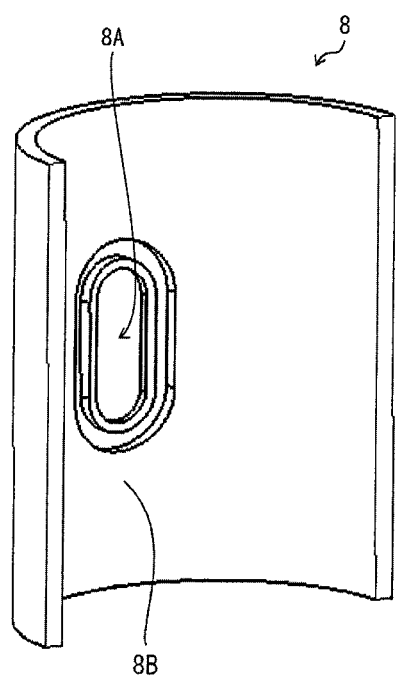
FIG. 5 is a partial perspective view of a communication member provided in the first fork leg as seen from an inner side of the communication member.
Figure 6:
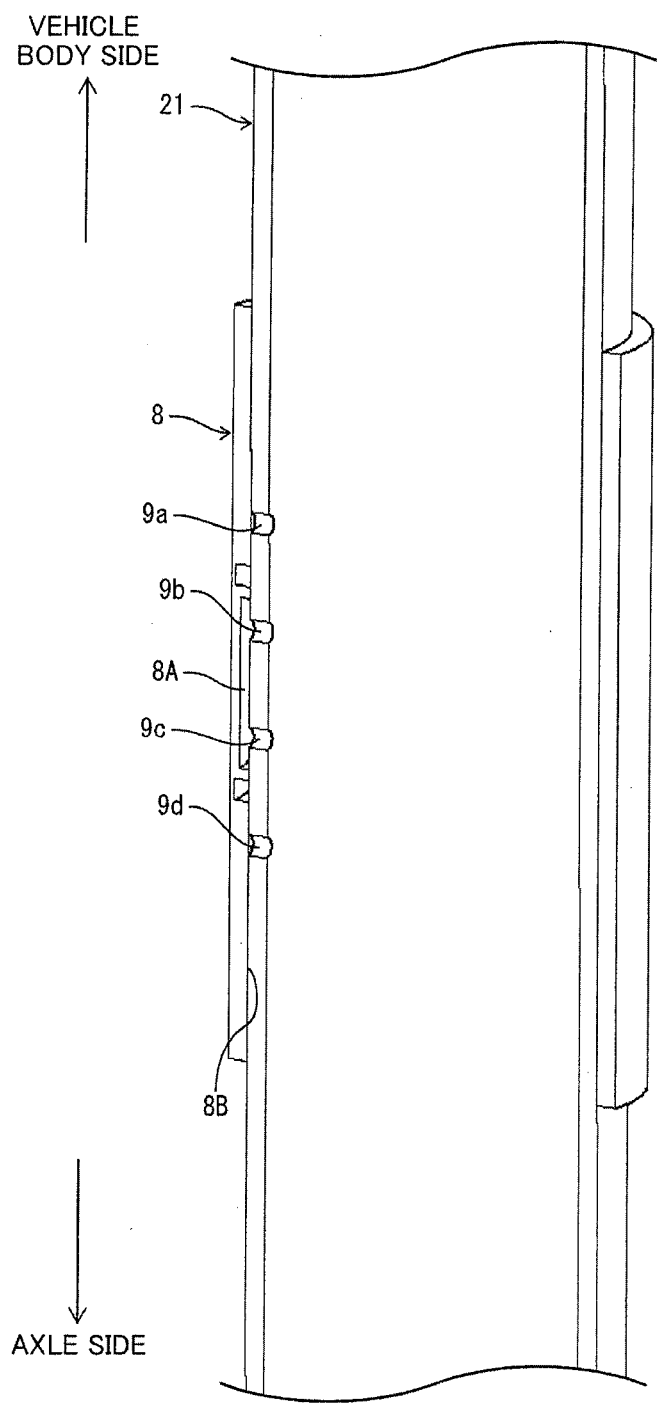
FIG. 6 is a partial perspective view of a cylinder to which the communication member is attached as seen from an inner side of the cylinder.

FIG. 5 is a partial perspective view of a communication member 8 provided in the first fork leg 11A as seen from an inner side of the communication member 8. FIG. 6 is a partial perspective view of the cylinder 21 to which the communication member 8 is attached as seen from an inner side of the cylinder 21.

As seen in FIGS. 3 to 6, the cylindrical communication member 8 is provided on an axle side of the outer peripheral surface of the cylinder 21. The communication member 8 is movable along the outer peripheral surface of the cylinder 21. A communication path 8A that is a recessed portion is formed in the inner peripheral surface of the communication member 8. Thus, between the outer peripheral surface of the cylinder 21 and the inner peripheral surface of the communication path 8A, a space through which the gas passes is formed.

In a part of a peripheral surface of the cylinder 21 on which the communication path 8A of the communication member 8 is positioned, a plurality of communication holes 9a to 9d are formed at intervals each equal to a length L1 along the axial direction. The communication path 8A may have any axial length that allows two of the plurality of communication holes 9a to 9d to communicate with each other.

The piston 23 has a sliding portion 23E that comes into contact with the inner peripheral surface of the cylinder 21 to partition the cylinder 21 into the inner chamber 50 and the balance chamber 70.

As depicted in FIG. 4, the axial length J1 of the sliding portion 23E is shorter than a length L1 between two adjacent communication holes along the axial direction, for example, the communication hole 9b (first communication hole) and the communication hole 9c (second communication hole). Specifically, the axial length J1 of the sliding portion 23E is preferably shorter than length between a lower end of the upper communication hole 9b and an upper end of the lower communication hole 9c, with these two communication holes 9b and 9c being adjacent to each other as depicted in FIG. 4. However, the axial length J1 of the sliding portion 23E may be shorter than the length between an upper end of the upper communication hole 9b and a lower end of the lower communication hole 9c, with these two communication holes 9b and 9c being adjacent to each other.

Figure 7:
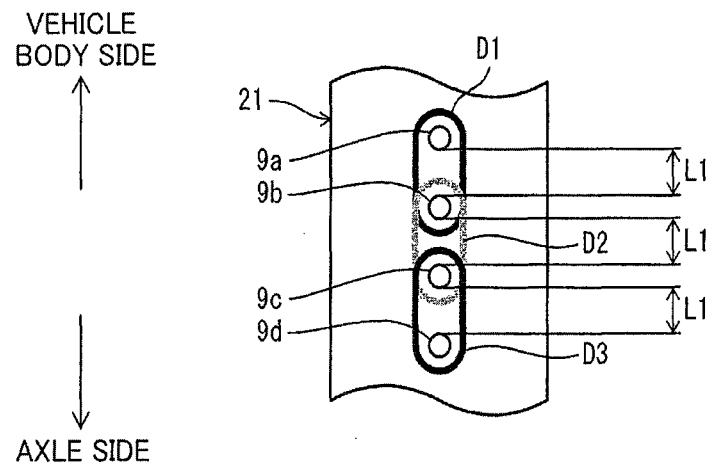
FIG. 7 is a schematic view illustrating a relation between a communication hole formed in the cylinder and a communication path formed in the communication member in the first fork leg according to Embodiment 1.

FIG. 7 is a schematic view illustrating a relation between the communication path 8A formed in the communication member 8 and the communication holes 9a to 9d formed in the cylinder 21 in the first fork leg 11A according to Embodiment 1.

An example will be described in which the four communication holes 9a to 9d are arranged at the intervals each equal to the length L1 along the axial direction. As depicted in FIG. 7, the communication hole 9a (first communication hole) is formed in the peripheral surface of the cylinder 21 at a position closest to the vehicle body. The communication hole 9b (second communication hole) is formed closer to the axle than the communication hole 9a to be second closest to the vehicle body and be distanced at the length L1 from the communication hole 9a. The communication hole 9c (third communication hole) is formed closer to the axle than the communication hole 9b to be third closest to the vehicle body and be distanced at the length L1 from the communication hole 9b. The communication hole 9d is formed closer to the axle than the communication hole 9c to be fourth closest to the vehicle body and be distanced at the length L1 from the communication hole 9c.

That is, on the peripheral surface of the cylinder 21, the four communication holes 9a to 9d are formed at the intervals each equal to the length L1 along the axial direction of the cylinder 21.

The length L1 is a distance between two points indicated by a coordinate axis corresponding to a major axis of the cylinder 21. The length L1 undergoes no change even with displacement of the positions of some of the communication holes 9a to 9d only in a circumferential direction.

As depicted in FIGS. 4 and 7, when the communication member 8 is attached to the cylinder 21 such that the communication path 8A of the communication member 8 is positioned in an area D1 that overlaps the communication holes 9a and 9b, the inner chamber 50 and the balance chamber 70 are permitted to communicate with each other through the two communication holes 9a and 9b and the communication path 8A when the sliding portion 23E of the piston 23 is positioned between the two communication holes 9a and 9b in the area D1. Then, internal pressures of the inner chamber 50 and the balance chamber 70 are made equal. The two communication holes 9c and 9d, positioned outside the range of the area D1, are closed by an inner peripheral surface 8B (closing surface) of the communication member 8.

In a case where the communication member 8 is attached to the cylinder 21 while being displaced with respect to the cylinder 21 in the axial direction such that the communication path 8A is positioned in an area D2, the inner chamber 50 and the balance chamber 70 are permitted to communicate with each other through the communication hole 9b, the communication path 8A, and the communication hole 9c when the sliding portion 23E of the piston 23 is positioned between the two communication holes 9b and 9c in the area D2.

In a case where the communication member 8 is attached to the cylinder 21 while being displaced with respect to the cylinder 21 in the axial direction such that the communication path 8A is positioned in an area D3, the inner chamber 50 and the balance chamber 70 are permitted to communicate with each other through the communication hole 9c, the communication path 8A, and the communication hole 9d when the sliding portion 23E of the piston 23 is positioned between the two communication holes 9c and 9d in the area D3.

The communication holes 9a to 9d are formed in the peripheral surface of the cylinder 21 as described above to permit the inner chamber 50 and the balance chamber 70 to communicate with each other to make the internal pressures of the inner chamber 50 and the balance chamber 70 equal. This eliminates a need to form a groove in the inner peripheral surface of the cylinder in order to make the internal pressures equal. As a result, an air spring structure can be provided which enables the internal pressures of the inner chamber 50 and the balance chamber 70 to be made equal using the simple configuration.

Furthermore, the communication member 8 is configured so as to allow a change of positions, where the inner chamber 50 and the balance chamber 70 communicate with each other, in the axial direction, by selective use of two of the communication holes 9a to 9d. Consequently, selection of the axial position of the communication member 8 allows the air reaction force characteristics of the inner chamber 50 and the balance chamber 70 to be adjusted to the desired air reaction force characteristics.

(1-3. Operation of the First Fork Leg 11A)

When the vehicle body is subjected to impact, the first fork leg 11A cushions the impact by performing a compressing operation (compression side stroke) in which the inner tube 16 and the outer tube 15 approach each other and an extending operation (extension side stroke) in which the inner tube 16 and the outer tube 15 leave each other.

During the compression stroke, volumes of the inner chamber 50 and the outer chamber 60 are reduced to compress the gas in the inner chamber 50 and outer chamber 60, thus generating reaction forces that bias the inner tube 16 and the outer tube 15 to leave each other.

During the extension stroke, the piston 23 and the rod guide 36 approach each other. Consequently, the volume of the balance chamber 70, which is a rebound air spring chamber, is reduced to compress the gas in the balance chamber 70. At this time, the gas in the balance chamber 70 and the subtank 22X defined by the rod 22 communicating with the balance chamber 70 and the gas in the subtank 38X in the cylinder 21 act as air springs to generate reaction forces that act to compress the front fork 4.

During an initial stage of the compression side stroke, when the sliding portion 23E of the piston 23 is positioned between two communication holes that face the communication path 8A in the communication member 8 attached to the cylinder 21, the inner chamber 50 and the balance chamber 70 are permitted to communicate with each other through the two communication holes and the communication path 8A to make the internal pressures of the inner chamber 50 and the balance chamber 70 equal.

During a last stage of the extension side stroke, when the sliding portion 23E is positioned between two communication holes facing the communication path 8A in the communication member 8, a process similar to the above-described process is performed.

(1-4. Air Reaction Force Characteristics of the First Fork Leg 11A)

Figure 11:
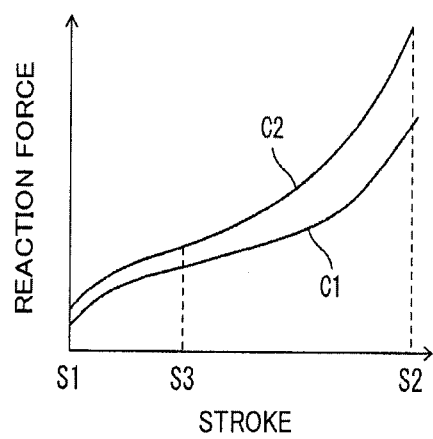
FIG. 11 is a graph illustrating air reaction force characteristics of a front fork according to a comparative example.

FIG. 11 is a graph illustrating air reaction force characteristics of a front fork according to a comparative example. A horizontal axis represents a stroke, and a vertical axis represents the reaction force exerted by the air spring. A stroke S1 corresponds to an extension state of the front fork. A stroke S2 corresponds to a compression state of the front fork.

When a sealing pressure of air in the inner chamber 50 is increased in a case where the groove is formed to make internal pressures of the inner chamber 50 and the balance chamber 70 equal in the inner peripheral surface of the cylinder as in the related art, an initial load of the compressing operation from the stroke S1 to the stroke S3 is disadvantageously higher, as illustrated by a curve C2, than before the sealing pressure of the air is increased (as illustrated by the curve C1).

Figure 8:
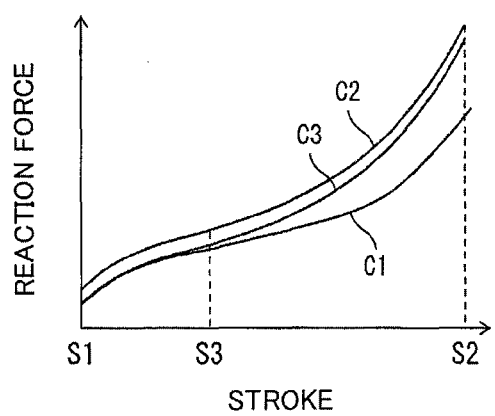
FIG. 8 is a graph illustrating air reaction force characteristics of the first fork leg according to Embodiment 1.

FIG. 8 is a graph illustrating the air reaction force characteristics of the first fork leg 11A according to Embodiment 1. A vertical axis represents the reaction force exerted by the air spring. The stroke S1 corresponds to the extension state of the front fork. The stroke S2 corresponds to the compression state of the front fork.

In the first fork leg 11A according to Embodiment 1 provided with the cylinder 21 having the communication holes 9a to 9d and with the communication member 8 with the communication path 8A formed therein, when the sealing pressure of the air in the inner chamber 50 is increased, an increase in the initial load of the compressing operation from the stroke S1 to the stroke S3 can be lowered, as illustrated by a curve C3, than that in the case of the related art, as illustrated by the above-described curve C2 in FIG. 11, by adjusting the position of the communication member 8. Thus, in the first fork leg 11A, any load characteristics can be selected by adjusting the position of the communication member 8.

(1-5. Effects of the First Fork Leg 11A)

The air spring structure according to Embodiment 1 and Embodiment 2 described below includes the cylinder 21, 21A with the first end thereof being a closed end, the rod 22 inserted into the cylinder 21, 21A in the axial direction via the second end of the cylinder 21, 21A, the piston 23 held by the rod 22 so as to slide on the inner peripheral surface of the cylinder 21, 21A, and the communication member 8 provided on the outer peripheral surface of the cylinder 21, 21A. The cylinder 21, 21A has the inner chamber 50 formed on the first end side of the piston 23 as an air spring, the balance chamber 70 formed on the second end side of the piston 23 as an air spring, the first communication hole 9a formed in the peripheral surface of the cylinder 21, 21A, and the second communication hole 9b formed in the peripheral surface at the position closer to the second end than the first communication hole 9a. The piston 23 has the sliding portion 23E that comes into contact with the inner peripheral surface of the cylinder 21, 21A to partition the cylinder 21, 21A into the inner chamber 50 and the balance chamber 70. The sliding portion 23E has the axial length shorter than the axial length between the first and second communication holes 9a and 9b. The communication member 8 has the communication path 8A formed so as to pass through the first and second communication holes 9a and 9b to allow the inner chamber 50 and the balance chamber 70 to communicate with each other.

Consequently, during the initial stage of the compression side stroke, when the sliding portion 23E of the piston 23 is positioned between the first and second communication holes 9a and 9b that face the communication path 8A in the communication member 8 attached to the cylinder 21, 21A, the inner chamber 50 and the balance chamber 70 are permitted to communicate with each other through the first and second communication holes 9a and 9b and the communication path 8A to make the internal pressures of the inner chamber 50 and the balance chamber 70 equal. This eliminates the need to form a passage or the groove in the inner peripheral surface of the cylinder as in the case of the related art. The internal pressures of the inner chamber 50 and the balance chamber 70, defined in the cylinder 21, 21A, can be made equal using the simple configuration in which the first and second communication holes 9a and 9b are formed in the peripheral surface of the cylinder 21, 21A and in which the communication member 8 is provided on the outer peripheral surface of the cylinder 21, 21A.

Rotation of the tubular communication member 8 around the axis thereof allows a phase of the first and second communication holes 9a and 9b to be shifted from a phase of the communication path 8A, thus allowing the communication between inner chamber 50 and the balance chamber 70 to be disabled. Thus, the communication between the inner chamber 50 and the balance chamber 70 can be easily enabled and disabled.

The present disclosure can be implemented simply by forming the communication member 8 to be tubular rather than cylindrical and connecting the opposite ends of the communication member 8 to the first and second communication holes 9a and 9b, respectively. In this case, similar effects are also produced.

The air spring structure further has the third communication hole 9c formed in the inner peripheral surface of the cylinder 21, 21A at the position closer to the second end than the second communication hole 9b. The sliding portion 23E has the axial length shorter than an axial length between the second communication hole 9b and the third communication hole 9c. The communication path 8A allows two of the first to third communication holes 9a to 9c to communicate with each other.

Consequently, the position of the communication member 8 in the axial direction can be selected to allow the inner chamber 50 and the balance chamber 70 to communicate with each other through two of the first to third communication holes 9a to 9c via the communication path 8A. Thus, the air reaction force characteristics of the inner chamber 50 and the balance chamber 70 can be adjusted to the desired air reaction force characteristics.

The communication member 8 of the air spring structure has the inner peripheral surface 8B that closes the third communication hole 9c when the communication path 8A allows the inner chamber 50 and the balance chamber 70 to communicate with each other through the first and second communication holes 9a and 9b.

This enables prevention of air leakage through the third communication hole 9c, which is other than the first and second communication holes 9a and 9b through which the inner chamber 50 and the balance chamber 70 communicate with each other via the communication path 8A.

In the air spring structure, the gas chamber 22U communicating with the balance chamber 70 is further formed inside the rod 22.

Consequently, the balance chamber 70 is expanded to allow realization of the desired characteristics of the air reaction force in a direction in which the front fork 4 is compressed during the extending operation.

(Embodiment 2)

(2-1. Configuration of the Cylinder 21A)

Figure 9:
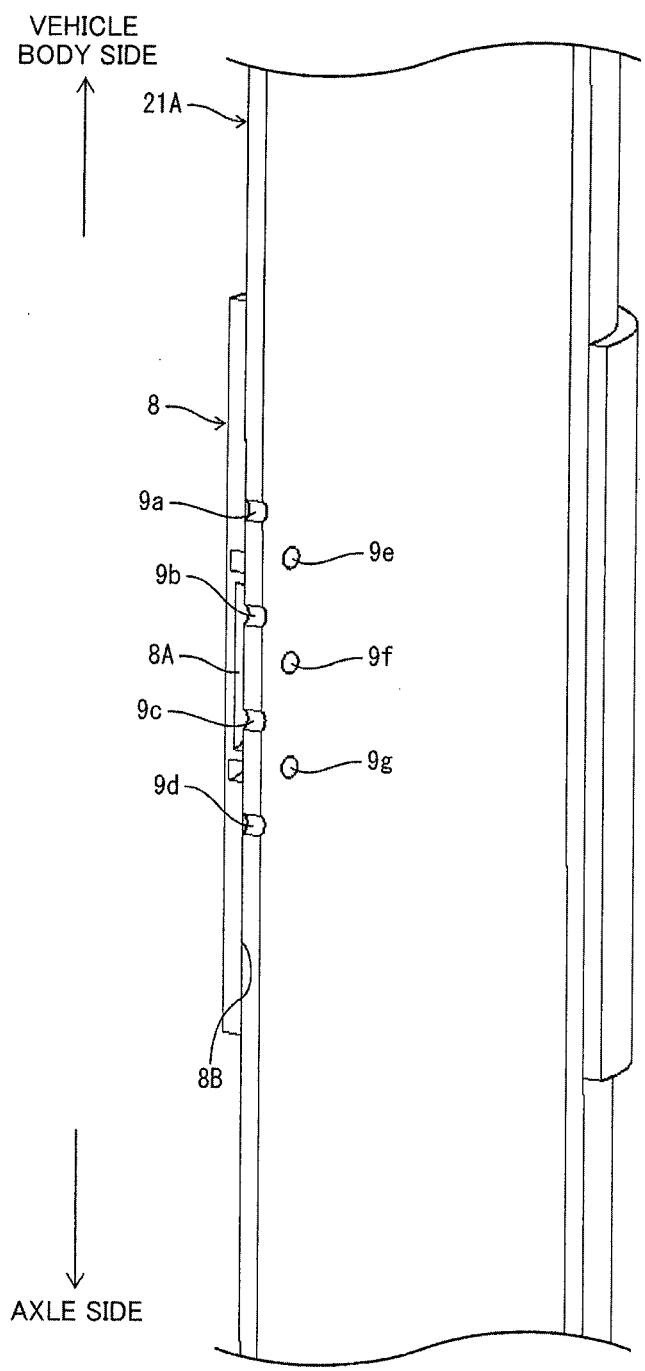
FIG. 9 is a partial perspective view of the cylinder to which the communication member in the first fork leg according to Embodiment 2 is attached as seen from the inner side of the cylinder.
Figure 10:
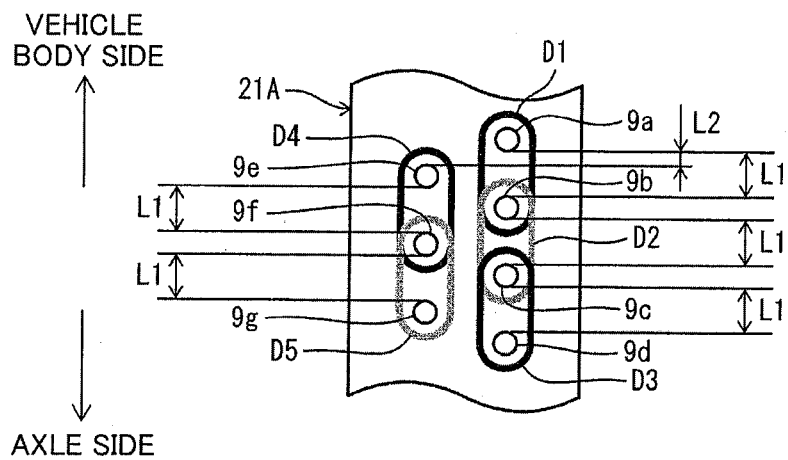
FIG. 10 is a schematic view illustrating a relation between the communication hole formed in the cylinder and the communication path formed in the communication member in the first fork leg according to Embodiment 2.

FIG. 9 is a partial perspective view of the cylinder 21A to which the communication member 8 of the first fork leg 11A according to Embodiment 2 is attached as seen from an inner side of the cylinder 21A. FIG. 10 is a schematic view illustrating a relation between the communication path 8A formed in the communication member 8 and communication holes 9a to 9g formed in the cylinder 21A of the first fork leg 11A according to Embodiment 2. The same components as those which are described above with reference to FIG. 6 are denoted by the same reference numerals. Detailed descriptions of these components will not be repeated.

The four communication holes 9a to 9d are formed in the peripheral surface of the cylinder 21A at intervals each equal to the length L1 along the axial direction. On the peripheral surface of the cylinder 21A, at a distance from the communication holes 9a to 9d in the circumferential direction, three communication holes 9e to 9g are formed at intervals each equal to the length L1 along the axial direction. The communication hole 9e is arranged between the communication hole 9a and the communication hole 9b in the axial direction. More strictly speaking, the coordinate of the communication hole 9e indicated by the coordinate axis along the axial direction is positioned between the coordinates of the communication hole 9a and the coordinates of the communication hole 9b, indicated by the coordinate axis. Similarly, the communication hole 9f is arranged between the communication hole 9b and the communication hole 9c in the axial direction, and the communication hole 9g is arranged between the communication hole 9c and the communication hole 9d in the axial direction.

When the communication member 8 is attached to the cylinder 21A such that the communication path 8A is positioned in the area D1 depicted in FIG. 10, the inner chamber 50 and the balance chamber 70 are permitted to communicate with each other through the two communication holes 9a and 9b and the communication path 8A when the sliding portion 23E of the piston 23 is positioned between the two communication holes 9a and 9b in the area D1. Then, the internal pressures of the inner chamber 50 and the balance chamber 70 are made equal. The five communication holes 9c to 9g, positioned outside a range of the area D1, are closed by the inner peripheral surface 8B (closing surface) of the communication member 8.

The communication member 8 according to Embodiment 2 is configured to be able to be attached to the cylinder 21 while being displaced with respect to the cylinder 21 in the axial direction and in the circumferential direction.

In a case where the communication member 8 is attached to the cylinder 21A while being displaced with respect to the cylinder 21A in the circumferential direction and in the axial direction such that the communication path 8A is positioned in an area D4, and when the sliding portion 23E of the piston 23 is positioned between the two communication holes 9e and 9f in the area D4, the inner chamber 50 and the balance chamber 70 are permitted to communicate with each other through the two communication holes 9e and 9f and the communication path 8A. The five communication holes 9a to 9d and 9g, positioned outside a range of the area D4, are closed by the inner peripheral surface 8B (closing surface) of the communication member 8.

A length L2, along the axial direction, between the vehicle body side communication hole 9a in the area D1 and the vehicle body side communication hole 9e in the area D4 is shorter than the length L1 between the two communication holes 9a and 9b in the area D1. Thus, for example, adjustment of the air reaction force characteristics by changing a position of the communication path 8A between the area D1 and the area D4 allows the air reaction force characteristics to be adjusted more finely than adjustment of the air reaction force characteristics by changing the position of the communication path 8A between the area D1 and the area D2.

(2-2. Effects Related to the Cylinder 21A)

The cylinder 21A in the air spring structure further has the third communication holes 9c and 9d formed in the peripheral surface of the cylinder 21A at a position closer to the second end than the second communication hole 9b, the fourth communication hole 9e formed away from the third communication holes 9c and 9d in the circumferential direction, and the fifth communication holes 9f and 9g formed in the peripheral surface of the cylinder 21A at a position closer to the second end than the fourth communication hole 9e. The cylinder 21A has a set of the communication holes 9a and 9b, a set of the communication holes 9b and 9c, a set of the communication holes 9c and 9d, a set of the communication holes 9e and 9f, and a set of the communication holes 9f and 9g. The sets of the communication holes are formed at different positions in the axial direction and the circumferential direction of the cylinder 21A.

Thus, the air reaction force characteristics can be more finely adjusted.

The communication member 8 of the air spring structure has the inner peripheral surface 8B that closes the communication holes except for the communication holes included in one of the set of the communication holes 9a and 9b, the set of the communication holes 9b and 9c, the set of the communication holes 9c and 9d, the set of the communication holes 9e and 9f, and the set of the communication holes 9f and 9g when the communication path 8A allows for communication between the communication holes included in said one of the sets of the communication holes.

This allows prevention of air leakage through the communication holes other than the communication holes 9a and 9b through which the inner chamber 50 and the balance chamber 70 communicate with each other via the communication path 8A.

(Embodiment 3)

(Variation of Arrangement of the Communication Holes)

As shown in FIG. 7, perfect alignment of the four communication holes 9a to 9d is no necessarily required in line along the major axis of the cylinder 21. Even if the positions of some of the communication holes 9a to 9d are slightly displaced in the circumferential direction, no problem occurs when the communication path 8A in the communication member 8 allows two of the communication holes 9a to 9d to communicate with each other.

For the arrangement of the seven communication holes 9a to 9g depicted in FIG. 11, perfect alignment of the communication holes 9a to 9d and the communication holes 9e to 9g is not necessarily required in line along the major axis of the cylinder 21A.

A major axis of the communication path 8A in the communication member 8 need not be formed parallel to the major axis of the cylinder 21, 21A. The communication path 8A may be formed in any manner so long as the communication path 8A allows two of the plurality of communication holes to communicate with each other.

The present disclosure is not limited to the above-described embodiments but various changes may be made to the embodiments within the scope described in the claims. Embodiments resulting from combination of technical means disclosed in the different embodiments are also included in the technical scope of the present disclosure.

EXPLANATION OF REFERENCE NUMERALS

3: Rear suspension, 4: Front fork, 8: Communication member, 8A: Communication path, 8B: Inner peripheral surface (closing surface), 9a to 9g: Communication holes (first communication hole, second communication hole, third communication hole, fourth communication hole, and fifth communication hole), 11A: First fork leg, 11B: Second fork leg, 12A: First bracket, 12B: Second bracket, 13: Steering shaft, 15: Outer tube, 16: Inner tube, 21: Cylinder, 22: Rod, 22U: Gas chamber (second end chamber), 23: Piston, 23E: Sliding portion, 50: Inner chamber (first end chamber), 60: Outer chamber, 70: Balance chamber (second end chamber).

What is claimed is:
1. An air spring structure comprising:
a cylinder having a first end that is a closed end and a second end;

a rod inserted into the cylinder in an axial direction from the second end of the cylinder;

a piston held by the rod so as to slide on an inner peripheral surface of the cylinder; and a communication member provided on an outer peripheral surface of the cylinder, wherein the cylinder has:
- a first end chamber formed as an air spring at a first end side of the piston;
- at least a part of a second end chamber formed as an air spring at a second end side of the piston;
- a plurality of communication holes including a first communication hole formed in a peripheral surface of the cylinder, a second communication hole formed in the peripheral surface of the cylinder at a position closer to the second end than the first communication hole, and a third communication hole formed in the peripheral surface of the cylinder at a position closer to the second end than the second communication hole, wherein the plurality of communication holes are aligned in the axial direction, the piston has a sliding portion that comes into contact with the inner peripheral surface of the cylinder and partitions the cylinder into the first end chamber and the second end chamber, the sliding portion has an axial length shorter than an axial length between the first communication hole and the second communication hole, and the communication member has a communication path formed so as to pass through only two holes selected from the plurality of communication holes to allow the first end chamber and the second end chamber to communicate with each other.

2. The air spring structure according to claim 1, wherein the sliding portion has the axial length shorter than an axial length between the second communication hole and the third communication hole.

3. The air spring structure according to claim 2, wherein the communication member has a closing surface that closes the third communication hole when the communication path allows the first end chamber and the second end chamber to communicate with each other through the first communication hole and the second communication hole.

4. The air spring structure according to claim 3, wherein a part of the second end chamber is further formed inside the rod.

5. The air spring structure according to claim 2, wherein a part of the second end chamber is further formed inside the rod.

6. The air spring structure according to claim 1, wherein
- the plurality of communication holes further include a fourth communication hole formed away from the third communication hole in a circumferential direction, and a fifth communication hole formed in the peripheral surface of the cylinder at a position closer to the second end than the fourth communication hole,
- the cylinder has multiple sets of the plurality of communication holes each including two of the first to fifth communication holes, and
- the multiple sets of the plurality of communication holes are formed at different positions in the axial direction and the circumferential direction of the cylinder.

7. The air spring structure according to claim 6, wherein
- the communication member has a closing surface that closes communication holes except for the communication holes included in one of the plurality of sets of the communication holes when the communication path allows for communication between the communication holes included in said one of the plurality of sets of the communication holes.

8. The air spring structure according to claim 7, wherein a part of the second end chamber is further formed inside the rod.

9. The air spring structure according to claim 6, wherein a part of the second end chamber is further formed inside the rod.

10. The air spring structure according to claim 6, wherein the only two holes are adjacent to each other.

11. The air spring structure according to claim 1, wherein a part of the second end chamber is further formed inside the rod.

12. The air spring structure according to claim 1, wherein the communication member that is movable along the outer peripheral surface of the cylinder in the axial direction.

13. The air spring structure according to claim 1, wherein the only two holes are adjacent to each other.

* * * * *